United States Patent
Weinstein et al.

(10) Patent No.: US 9,858,922 B2
(45) Date of Patent: Jan. 2, 2018

(54) CACHING SPEECH RECOGNITION SCORES

(71) Applicant: Google Inc., Mountain View, CA (US)

(72) Inventors: Eugene Weinstein, New York, NY (US); Sanjiv Kumar, Brooklyn, NY (US); Ignacio L. Moreno, New York, NY (US); Andrew W. Senior, New York, NY (US); Nikhil Prasad Bhat, New York, NY (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 14/311,557

(22) Filed: Jun. 23, 2014

(65) Prior Publication Data

US 2015/0371631 A1    Dec. 24, 2015

(51) Int. Cl.
*G10L 15/08* (2006.01)
*G10L 15/28* (2013.01)

(52) U.S. Cl.
CPC ............ *G10L 15/08* (2013.01); *G10L 15/285* (2013.01)

(58) Field of Classification Search
CPC ...... G10L 15/148; G10L 15/08; G10L 15/285
USPC ........................................................ 704/256
See application file for complete search history.

(56) References Cited

U.S. PATENT DOCUMENTS

| | | | |
|---|---|---|---|
| 4,759,068 A | 7/1988 | Bahl et al. | |
| 4,799,262 A | 1/1989 | Feldman | |
| 4,817,156 A | 3/1989 | Bahl et al. | |
| 4,819,271 A | 4/1989 | Bahl et al. | |
| 4,868,867 A | 9/1989 | Davidson | |
| 5,018,088 A | 5/1991 | Higbie | |
| 5,033,087 A | 7/1991 | Bahl et al. | |
| 5,268,990 A | 12/1993 | Cohen et al. | |
| 5,444,488 A | 8/1995 | Goubault | |
| 5,465,318 A | 11/1995 | Sejnoha | |
| 5,502,791 A | 3/1996 | Nishimura et al. | |
| 5,625,749 A | 4/1997 | Goldenthal et al. | |
| 5,627,939 A | 5/1997 | Huang | |
| 5,679,001 A | 10/1997 | Russell et al. | |

(Continued)

FOREIGN PATENT DOCUMENTS

| | | |
|---|---|---|
| CN | 1211026 | 3/1999 |
| CN | 1233803 | 11/1999 |

(Continued)

OTHER PUBLICATIONS

"Locality-Sensitivity Hashing," Wikipedia, downloaded from the internet on Jun. 16, 2014, 7 pages , http://en.wikipedia.org/wiki/Locality-sensitive_hashing.

(Continued)

*Primary Examiner* — Houshang Safaipour
*Assistant Examiner* — Bharatkumar S Shah
(74) *Attorney, Agent, or Firm* — Fish & Richardson P.C.

(57) ABSTRACT

Methods, systems, and apparatus, including computer programs encoded on a computer storage medium, for caching speech recognition scores. In some implementations, one or more values comprising data about an utterance are received. An index value is determined for the one or more values. An acoustic model score for the one or more received values is selected, from a cache of acoustic model scores that were computed before receiving the one or more values, based on the index value. A transcription for the utterance is determined using the selected acoustic model score.

20 Claims, 5 Drawing Sheets

(56) References Cited

U.S. PATENT DOCUMENTS

| | | | |
|---|---|---|---|
| 5,680,508 A | 10/1997 | Liu | |
| 5,729,656 A | 3/1998 | Nahamoo et al. | |
| 5,745,872 A | 4/1998 | Sommez | |
| 5,758,024 A | 5/1998 | Alleva | |
| 5,839,105 A | 11/1998 | Ostendorf | |
| 5,937,384 A | 8/1999 | Huang et al. | |
| 5,953,701 A | 9/1999 | Neti et al. | |
| 6,038,528 A | 3/2000 | Mammone | |
| 6,038,533 A | 3/2000 | Buchsbaum et al. | |
| 6,067,517 A | 5/2000 | Bahl | |
| 6,108,627 A | 8/2000 | Sabourin | |
| 6,141,641 A | 10/2000 | Hwang et al. | |
| 6,151,575 A | 11/2000 | Newman et al. | |
| 6,243,680 B1 | 6/2001 | Gupta et al. | |
| 6,260,013 B1 | 7/2001 | Sejnoha | |
| 6,381,569 B1 | 4/2002 | Sih | |
| 6,434,520 B1 | 8/2002 | Kanevsky | |
| 6,591,235 B1 | 7/2003 | Chen et al. | |
| 6,631,348 B1 | 10/2003 | Wymore | |
| 6,633,842 B1 | 10/2003 | Gong | |
| 6,658,385 B1 | 12/2003 | Gong | |
| 6,681,206 B1 | 1/2004 | Gorlin et al. | |
| 6,876,966 B1 | 4/2005 | Deng | |
| 7,035,789 B2 | 4/2006 | Abrego et al. | |
| 7,062,442 B2 | 6/2006 | Berg et al. | |
| 7,065,487 B2 | 6/2006 | Miyazawa | |
| 7,085,720 B1 | 8/2006 | Gorin et al. | |
| 7,113,903 B1 | 9/2006 | Riccardi et al. | |
| 7,263,486 B1* | 8/2007 | Hakkani-Tur | G10L 15/063 704/241 |
| 7,310,600 B1 | 12/2007 | Garner et al. | |
| 7,424,426 B2 | 9/2008 | Furui | |
| 7,444,282 B2 | 10/2008 | Choo et al. | |
| 7,447,635 B1 | 11/2008 | Konopka et al. | |
| 7,467,087 B1 | 12/2008 | Gillick et al. | |
| 7,650,331 B1 | 1/2010 | Dean et al. | |
| 8,239,195 B2 | 8/2012 | Li | |
| 8,340,308 B2 | 12/2012 | Chen | |
| 8,442,125 B2 | 5/2013 | Covell | |
| 8,463,719 B2 | 6/2013 | Lyon | |
| 8,494,850 B2 | 7/2013 | Chelba et al. | |
| 8,615,397 B2 | 12/2013 | Hart | |
| 8,620,662 B2 | 12/2013 | Bellegarda | |
| 8,782,012 B2* | 7/2014 | Fusco | G06F 17/30324 707/673 |
| 8,959,014 B2 | 2/2015 | Xu et al. | |
| 9,009,039 B2 | 4/2015 | Seltzer | |
| 9,123,338 B1 | 9/2015 | Sanders | |
| 9,299,347 B1 | 3/2016 | Siohan et al. | |
| 9,336,771 B2 | 5/2016 | Chelba | |
| 2001/0001141 A1 | 5/2001 | Sih | |
| 2002/0040296 A1 | 4/2002 | Kienappel | |
| 2002/0087314 A1 | 7/2002 | Fischer et al. | |
| 2002/0087317 A1 | 7/2002 | Lee et al. | |
| 2002/0165715 A1 | 11/2002 | Riis | |
| 2003/0033143 A1 | 2/2003 | Aronowitz | |
| 2003/0088411 A1 | 5/2003 | Ma | |
| 2003/0110035 A1 | 6/2003 | Thong et al. | |
| 2004/0088163 A1 | 5/2004 | Schalkwyk | |
| 2004/0138882 A1 | 7/2004 | Miyazawa | |
| 2004/0162722 A1 | 8/2004 | Rex | |
| 2004/0181408 A1 | 9/2004 | Acero | |
| 2004/0230424 A1 | 11/2004 | Gunawardana | |
| 2004/0260546 A1 | 12/2004 | Seo | |
| 2005/0256715 A1 | 11/2005 | Okimoto et al. | |
| 2006/0020461 A1 | 1/2006 | Ogawa | |
| 2006/0031069 A1 | 2/2006 | Huang et al. | |
| 2006/0053008 A1 | 3/2006 | Droppo | |
| 2006/0116997 A1 | 6/2006 | Yu et al. | |
| 2006/0149558 A1 | 7/2006 | Kahn et al. | |
| 2006/0184362 A1 | 8/2006 | Preuss | |
| 2006/0195317 A1 | 8/2006 | Graciarena | |
| 2007/0011010 A1 | 1/2007 | Dow et al. | |
| 2007/0027698 A1 | 2/2007 | Daul et al. | |
| 2007/0088552 A1 | 4/2007 | Olsen | |
| 2007/0118373 A1 | 5/2007 | Wise et al. | |
| 2008/0262828 A1 | 10/2008 | Och et al. | |
| 2008/0281857 A1 | 11/2008 | Dymetman | |
| 2008/0300875 A1 | 12/2008 | Yao | |
| 2009/0254343 A1 | 10/2009 | Hart | |
| 2010/0070263 A1 | 3/2010 | Goto et al. | |
| 2010/0070277 A1 | 3/2010 | Arakawa et al. | |
| 2010/0114572 A1* | 5/2010 | Tani | G10L 17/08 704/247 |
| 2010/0318354 A1 | 12/2010 | Seltzer | |
| 2011/0103614 A1 | 5/2011 | Cheung et al. | |
| 2011/0173208 A1 | 7/2011 | Vogel | |
| 2011/0238416 A1 | 9/2011 | Seltzer | |
| 2011/0307253 A1 | 12/2011 | Lloyd | |
| 2012/0004909 A1 | 1/2012 | Beltman | |
| 2012/0143604 A1 | 6/2012 | Singh | |
| 2013/0151263 A1* | 6/2013 | Lee | G10L 19/02 704/500 |
| 2013/0223645 A1 | 8/2013 | Hetherington | |
| 2013/0238324 A1 | 9/2013 | Ichikawa | |
| 2013/0297299 A1 | 11/2013 | Chakrabartty | |
| 2014/0188487 A1 | 7/2014 | Perez | |
| 2015/0127342 A1 | 5/2015 | Sharifi | |
| 2015/0371633 A1* | 12/2015 | Chelba | G10L 15/22 704/240 |
| 2016/0171977 A1 | 6/2016 | Siohan et al. | |

FOREIGN PATENT DOCUMENTS

| | | |
|---|---|---|
| EP | 0953970 | 11/1999 |
| EP | 715298 B1 | 9/2000 |
| EP | 2431969 B1 | 4/2013 |
| EP | 2507790 B1 | 1/2014 |
| WO | WO02093934 A1 | 11/2002 |

OTHER PUBLICATIONS

Goffin, V. et al., "The AT&T Watson Speech Recognizer," in Proceedings of ICASSP 2005, 4 pages.

Kinnunen, T. et al: "Real-time speaker identification and verification", IEEE Transactions on Audio, Speech and Language Processing, vol. 14, No. 1, Jan. 1 2006 (Jan. 1, 2006), 13 pages.

Ramaswamy, Ganesh N. et al., "Compression of Acoustic Features for Speech Recognition in Network Environments," ICASSP 1998, 4 pages.

Williams, Gethin, et al. Speech/Music Discrimination Based on Posterior Probability Features, Submitted to Eurospeech '99, Budapest, 4 pages.

Soong et al., "A Vector Quantization Approach to Speaker Recognition," 1985 IEEE International Conference on Acoustics, Speech, and Signal Processing, vol. 10, Apr. 1985, 387-390.

"Vector Quantization" Data-Compression.com, a website devoted to the principles and practice of data compression, 6 pages, http://www.data-compression.com/vq.html (accessed Aug. 2012).

Banjeree, Pratyush et al., "Application of Triphone Clustering in Acoustic Modeling for Continuous Speech Recognition in Bengali," 19th International Conference on Pattern Recognition, 2008. (ICPR 2008), 4 pages.

Brants et al. "Large language models in machine translation," *Proceedings of the 2007 Joint Conference Empirical Methods in Natural Language Processing and Computational Natural Language Learning (EMNLP-CoNLL)*, 2007, p. 858-867 (10 pages).

Brants et al., "Distributed language models," in *HLT-NAACL (Tutorial Abstracts)* '09, 2009, pp. 3-4 (2 pages).

Chang et al., "Bigtable: A distributed storage system for structured data," *ACM Transactions on Computer Systems (TOCS)*, 2008, 26(2):1-26 (28 pages).

Chelba et al., "Distributed acoustic modeling with back-off n-grams," in Proceedings of ICASSP, Kyoto, Japan, Mar. 2012, pp. 4129-4132. (4 pages).

Chelba et al., "Query language modeling for voice search," in *Spoken Language Technology Workshop (SLT)*, 2010, 127-132 (6 pages).

(56) References Cited

OTHER PUBLICATIONS

Coxhead, "A Glossary of Linguistic Terms," University of Birmingham, School of Computer Science www.cs.bham.ac.uk/~pxc/nlpa/nlpgloss.html (accessed Jun. 7, 2012) (16 pages).

Dean et al., "MapReduce: simplified data processing on large clusters," *Commun. ACM*, 2008, 51:107-113 (10 pages).

Gales et al., "Progress in the CU-HTK broadcast news transcription system," *Audio, Speech, and Language Processing, IEEE Transactions on*, 2006, 14(5):1513-1525 (16 pages).

Gales, "Semi-tied covariance matrices for hidden markov models," *IEEE Transactions in Speech and Audio Processing*, 1999, 7:272-281 (10 pages).

Gauvain, J.L. et al., "Developments in Continuous Speech Dictation using the ARPA WSJ Task," Proc. IEEE ICASSP-95, 1995, 4 pages, ftp://192.44.78.170/public/ica95lv.pdf.

Halevy et al., "The unreasonable effectiveness of data," *IEEE Intelligent Systems*, 2009, 24(2):8-12 (5 pages).

Kim et al., "Recent advances in broadcast news transcription," *Automatic Speech Recognition and Understanding, ASRU'03. IEEE Workshop on. IEEE*, 2003, pp. 1-6 (8 pages).

Mohri et al., "Weighted finite-state transducers in speech recognition," *Computer Speech & Language*, 2002, 16(1):69-88 (27 pages).

Niesler, T.R. and P.C. Woodland "Variable-length category-based n-grams for language modelling," Technical report CUED/FINFENG/TR.215, Department of Engineering, University of Cambridge, U.K., Apr. 1995.

Novotney, Scott et al., "Unsupervised Acoustic and Language Model Training with Small Amounts of Labelled Data," IEEE International Conference on Acoustics, Speech and Signal Processing, 2009 (ICASSP 2009.), 4 pages http://old-site.clsp.jhu.edu/people/snovotne/papers/novotney_icassp09.pdf.

Popescu, Vladimir et al, "Parallel training algorithms for continuous speech recognition, implemented in a message passing framework", 14th European Signal Processing Conference (EUSIPCO 2006), Sep. 8, 2006 (Sep. 8, 2006), pp. 1-5, Florence, Italy, Retrieved from the Internet on Dec. 7, 2012: URL:http://www.eurasip.org/Proceedings/Eusipco/Eusipco2006/papers/1568981978.pdf, 4 pages.

Povey et al., "Boosted MMI for model and feature space discriminative training," in *Proceedings of ICASSP*, 2008, pp. 1-4 (4 pages).

Reynolds, D. A., "Gaussian Mixture Models, Encyclopedia of Biometric Recognition," Springer (2008). 5 pages http://www.11.mit.edu/mission/communications/ist/publications/0802_Reynolds_Biometrics-GMM.pdf.

Rybach, David et al, "Advances in Arabic Broadcast News Transcription at RWTH", Automatic Speech Recognition & Understanding, 2007. ASRU. IEEE Works Hop on, IEEE, PI,Dec. 1, 2007 (Dec. 1, 2007), pp. 449-454.

Schwartz et al., "Improved Hidden Markov modeling of phonemes for continuous speech recognition," in *Proceedings of ICASSP*, 1984, 9:21-24 (4 pages).

Segura, JoséC., et al. "Cepstral domain segmental nonlinear feature transformations for robust speech recognition." Signal Processing Letters, IEEE11.5 (2004): 517-520.

Vitter, "Random sampling with a reservoir," *ACM Transactions on Mathematical Software (TOMS)*, 1985, 11( 1):37-57 (21 pages).

Watanabe et al., "Variational bayesian estimation and clustering for speech recognition," *IEEE Transactions on Speech and Audio Processing*, 2004, 12(4):365-381 9 (17 pages).

Young et al., "The HTK Book," Cambridge University Engineering Department, Cambridge, England, 2002, 384 pages.

Young et al., "Tree-based state tying for high accuracy acoustic modeling," in *Proceedings ARPA Workshop on Human Language Technology*, 1994, 307-312 (6 pages).

Zweig, Geoffrey et al., "Continuous Speech Recognition with a TF-IDF Acoustic Model," Interspeech 2010, 4 pages, http://research.microsoft.com/pubs/131332/tfidf_am.pdf.

Tomar et al., "Efficient manifold learning for speech recognition using locality sensitive hashing," Acoustics, Speech and Signal Processing (ICASSP), 2013 IEEE International Conference on. IEEE, 2013, pp. 6995-6999.

U.S. Non-Final Office Action issued in U.S. Appl. No. 15/049,892, dated Mar. 10, 2017, 9 pages.

\* cited by examiner

CACHING SPEECH RECOGNITION SCORES

FIELD

This disclosure relates to caching speech recognition scores.

BACKGROUND

Speech recognition systems typically aim to convert a voice input from a user into a natural language transcription. Speech recognition systems may use an acoustic model in the process of determining the words that a user has spoken. For example, an acoustic model may include statistical information that can be used to estimate which speech sounds occur in audio.

SUMMARY

In some implementations, speech recognition scores, such as acoustic model scores, may be stored in a cache. Information about an utterance, such as a set of speech features or data derived from speech features, can be mapped to the stored scores. A speech recognition module can use scores from the cache to generate a transcription for the utterance, instead of evaluating a speech recognition model to generate speech recognition scores.

In some implementations, an utterance is detected at a client device, and a server system performs speech recognition to determine a transcription for the utterance. To limit the amount of data transferred between the client device and the server system, the client device may process detected audio and extract speech features. The client device may compress the speech features, for example, using vector quantization to map feature vectors to lower dimensional vectors. The client device may then send the compressed data to the server system, allowing the server system to perform speech recognition using the compressed data.

In a general aspect, a method includes receiving one or more values comprising data about an utterance; determining an index value for the one or more values; selecting, from a cache of acoustic model scores that were computed before receiving the one or more values, an acoustic model score for the one or more received values based on the index value; and determining a transcription for the utterance using the selected acoustic model score.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Implementations may include one or more of the following features. For example, generating the index value includes generating a hash value for the one or more values using a locality sensitive hash function. Selecting the acoustic model score for the received one or more values includes selecting an acoustic model score previously generated for a set of values that matches the received one or more values. Selecting the acoustic model score for the received one or more values includes selecting an acoustic model score previously generated for a set of values that does not exactly match the received one or more values, the acoustic model score approximating an acoustic model score for the received one or more values. The one or more values include information derived from a particular speech frame and information derived from contextual speech frames occurring before or after the particular frame. Determining the index value for the one or more values includes determining the hash value for the particular speech frame based on the information derived from a particular speech frame and information derived from the contextual speech frames occurring before or after the particular frame. Selecting the acoustic model score includes selecting an acoustic model score indicating a likelihood that the particular speech frame is an occurrence of a particular phonetic unit in the utterance. Multiple acoustic model scores are selected from the cache based on the index value, each of the multiple acoustic model scores indicating a likelihood that the utterance includes a different phonetic unit in a portion corresponding to the one or more values. Receiving the one or more values includes, receiving the one or more values from a client device over a network. The transcription is provided to the client device over the network. The one or more values include results of compressing speech features for the utterance using vector quantization.

Advantageous implementations can include one or more of the following features. The speed of speech recognition processing can be increased. Delays in providing speech recognition results can be decreased. The computational requirements for generating transcriptions of speech can be reduced.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
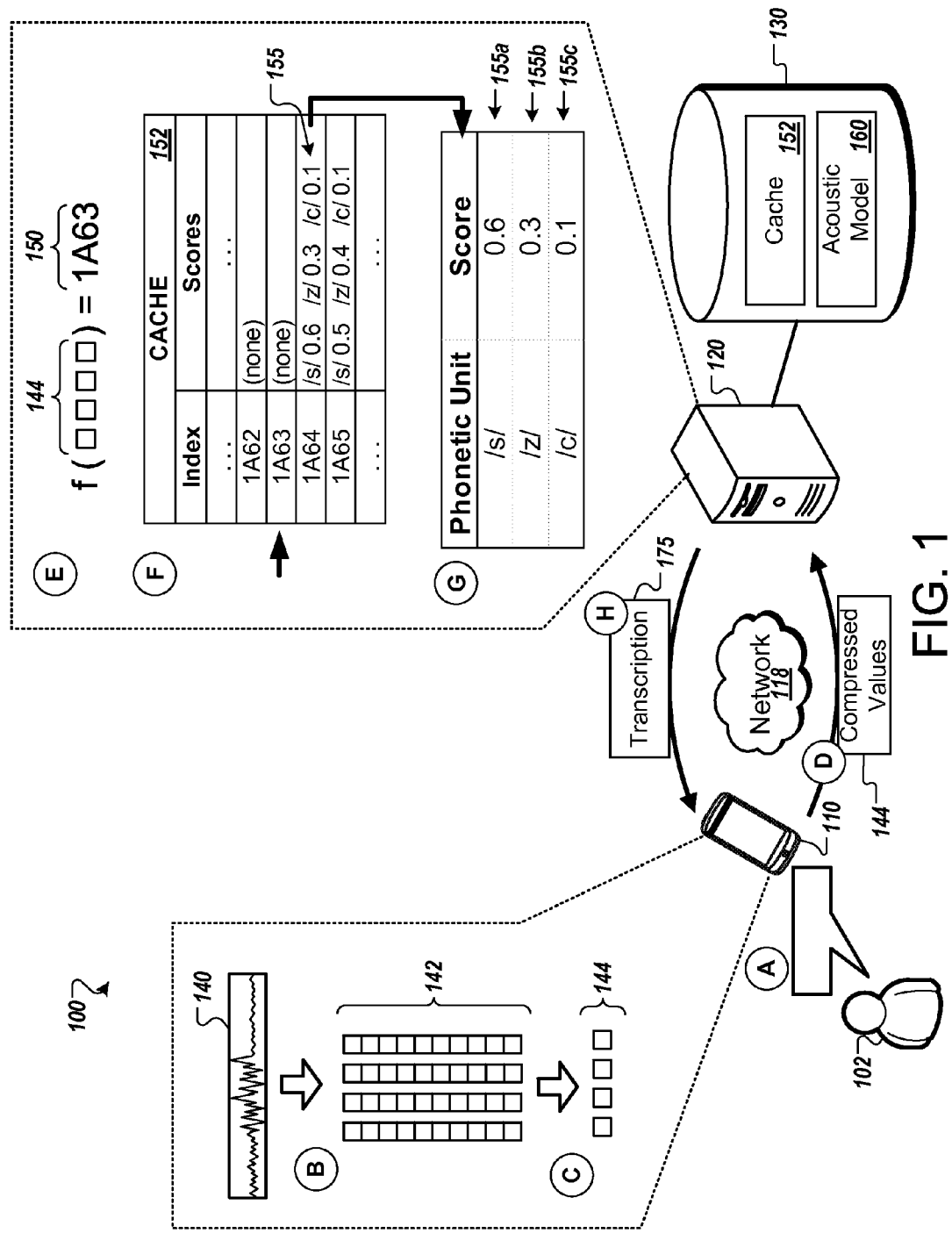
FIG. 1 is a diagram that illustrates an example of a system for performing speech recognition using cached speech recognition scores.

FIG. 1 is a diagram that illustrates an example of a system 100 for performing speech recognition using cached speech recognition scores. The system 100 includes a client device 110, a server system 120 which may include one or more computers, and one or more data storage devices 130 that are in communication with the server system 120. FIG. 1 shows stages (A) to (H) which illustrate a flow of data.

In the system 100, the client device 110 can be, for example, a desktop computer, laptop computer, a tablet computer, a wearable computer, a cellular phone, a smart phone, a music player, an e-book reader, a navigation system, or any other appropriate computing device. The functions performed by the server system 120 can be performed by individual computer systems or can be distributed across multiple computer systems. The network 130 can be wired or wireless or a combination of both and can include the Internet.

Some speech recognition systems allow a client device, such as a mobile phone, to send speech data to a speech recognition server or other back-end system for processing. Servers typically have much greater computing resources than client devices, which may allow a server to determine transcriptions more quickly or more accurately than a client device. In some speech recognition systems, a client device makes an audio recording of a user's speech and sends the recorded audio, e.g., an audio waveform, to a speech recognition server. However, in some instances, slow data transmission speeds or poor network connectivity can decrease performance. In addition, sending recorded audio over a network from a mobile device may cause a user to incur substantial network usage charges.

In some implementations, a client device computes speech features from detected audio and sends the feature values to a server system instead of sending audio recordings. The client device may compress speech feature vectors or other speech data to additionally reduce the overall amount of data that is transferred over a network. In some implementations, the client device uses quantization techniques to map speech features to more compact representations. For example, vector quantization can be used to map speech feature vectors to lower dimensional vectors.

The process of recognizing speech can also be enhanced by using cached speech recognition scores. As discussed further below, a speech recognition engine may use one or more models to evaluate speech and estimate what a user has spoken. For example, an acoustic model may generate scores indicating likelihoods that a portion of an utterance corresponds to particular speech sounds. A language model may generate scores indicating likelihoods of candidate transcriptions of the speech recording, and may be used in conjunction with the acoustic model to produce the overall likelihood that the sounds correspond to particular words and sequences of words. Evaluating a model to produce speech recognition scores can be computationally demanding, and the time required to obtain scores from a model may result in a significant delay in producing a transcription.

In some implementations, speech recognition scores are obtained from a cache rather than evaluating a model. Speech recognition scores may be pre-computed for a variety of potential inputs to a model, and the speech recognition scores may be stored in the cache. When compressed speech features or other data about an utterance is received, a speech recognition engine may look up appropriate scores in the cache. For example, the cache may be structured as a hash table, and a hash of the data about the utterance may be used to locate appropriate scores. When the needed scores are located in the cache, the time required to obtain the scores can be much less than the delay to compute scores using a model such as a Gaussian mixture model (GMM) or deep neural network (DNN).

In some implementations, an acoustic model, such as the acoustic model 160 shown in FIG. 1, may be replaced by a collection of labeled samples whose phonetic state label is known in advance. Scores in that case may be pre-assigned to each speech frame in the collection using force alignment against a large ASR model. For some or all of the speech frames, the corresponding scores may be stored in a cache and used to later recognize speech. In some implementations, the entire collection of labeled samples and their corresponding scores, or data derived from the collection such as averaged scores for sets of similar speech frames, may be stored and accessed to obtain scores without evaluating a model. When input speech to be recognized is received, frames of the input speech may be assigned the scores that were previously assigned to similar frames in the collection of labeled samples. Speech frames may be identified as similar to each other based on, for example, having hash values that are identical or nearby, e.g., within a certain distance, when the hash values are produced using a locality sensitive hashing algorithm.

Storing and retrieving speech recognition scores can be facilitated by using vector quantization of speech features. Vector quantization can be used to map a highly variable set of data to a smaller range of discrete possibilities. For example, a large number of real-valued speech features can be mapped to a small number of integers. The vector quantization process greatly reduces the number of unique input combinations that may occur, which makes it more feasible to store a significant portion of the acoustic model scores in a cache.

In some implementations, the server system 120 receives one or more values comprising data about an utterance. The server system 120 determines an index value for the one or more values. The server system 120 selects an acoustic model score based on the index value. For example, the acoustic model score is selected from a cache of acoustic model scores that were computed before the server system 120 received the one or more values. The server system 120 also determines a transcription for the utterance using the selected acoustic model score.

In the example of FIG. 1, the client device 110 generates data about an utterance and sends the data to the server system 120 to obtain a transcription for the utterance. The server system 120 uses the data to retrieve speech recognition scores from a cache, and uses the retrieved scores to determine a transcription for the utterance.

In further detail, during stage (A), a user 102 speaks an utterance to be transcribed, and the user's utterance is recorded by the client device 110. For example, the client device 110 may use a microphone to detect audio including the utterance, and the client device 110 may record audio waveform data 140 for the detected audio.

During stage (B), the client device 110 computes speech features 142 for the utterance. Speech recognition systems may use only certain components of an audio signal to determine the content of an utterance. The speech features 142 omit information from the audio waveform data 140 that the server system 140 would not use during speech recognition. The client device 110 computes speech features, e.g., values indicating characteristics of the audio waveform data 140, that will be useful to speech recognition algorithms. As an example, the speech features 142 may include, mel filterbank energies, which may be computed by binning energies at different frequency ranges on a logarithmic scale. As another example, the speech features 142 may include mel frequency cepstral coefficients (MFCCs) produced from filterbank channels.

A set of speech features 142 may be computed for each of various segments of the audio waveform data 140. As an example, the audio waveform data 140 may be divided into speech frames that each have a duration of, for example, 25 milliseconds, and a set of speech features may be computed for each speech frame.

In some implementations, the speech features 142 for a particular speech frame may include contextual information about previous and subsequent values of the feature signal, e.g., information that reflects audio characteristics of previous or subsequent speech frames. For example, information about first and second order derivatives of the feature signals may be included in a set of speech features 142. A 13-dimensional MFCC vector for a particular speech frame may be augmented with a 13-dimensional vector representing first order derivatives and another 13-dimensional vector representing second order derivatives, resulting in a 39-dimensional vector. As another example, the speech features for previous and/or subsequent speech frames may be combined with the speech features computed for the current frame. For example, a 40-channel mel-filterbank energy vector may be augmented with the 40-channel energy vector for each of the previous twenty speech frames and each of the subsequent five speech frames, resulting in a total of 26×40=1040 feature values for each speech frame.

In the example of FIG. 1, the speech features 142 represent a set of values used to recognize a single speech frame, and the values indicate characteristics of the single speech frame as well as any contextual information to be used when recognizing the speech frame. The speech features 142 may be organized as one or more vectors. For example, information about a speech frame and contextual information may be combined into a single vector or used as separate vectors. The speech features 142 used may include more or fewer values than illustrated, and the speech vectors 142 may be organized in more or fewer vectors than illustrated.

During stage (C), the client device 110 compresses the speech features 142 to generate compressed values 144. The client device 110 may apply quantization algorithms to compress the speech features 142. A variety of different approaches may be used. In some implementations, each speech feature 142 may be quantized separately, for example, from a floating point value to an integer. For example, 64-bit floating point values may be compressed to 8-bit integer values, resulting in an 8-fold rate of compression.

In some implementations, vector quantization is applied to the speech features 142. Vector quantization can make use of a codebook that indicates values or codes that correspond to centroids of clusters in the feature space. The codebook may have been previously developed using a clustering algorithm. Once a vector of speech features 142 has been determined, the client device 110 may determine which centroid the vector is closest to. For example, the centroid with the smallest Euclidean distance to the feature vector may be selected. The code corresponding to the centroid may then be used as a compressed version of the vector. In some instances, a vector may be mapped to a single value. For example, a vector of 40 floating point values may be mapped to a single 8-bit integer, resulting in a 320-fold compression factor.

The amount of compression may be set to achieve a desired compression rate or quality level. In some implementations, a set of speech features 142 is divided into multiple groups or "chunks," and vector quantization is performed for each chunk. For example, a 40-dimensional feature vector may be divided into four 10-dimensional chunks. A different codebook, e.g., a different mapping of codes to clusters or centroids, may be used for each chunk. The codebooks may be developed in advance, e.g., based on characteristics of training data indicating speech features of various speech samples. The client device 110 uses the codebooks to map each chunk of the speech features 142 to a particular code in the corresponding codebook. If the codebook divides the feature space into 256 clusters, each code may be a 1-byte integer. Thus a feature vector of 40 4-byte floating point values may be mapped to 4 1-byte integers, resulting in a 40-fold compression factor. The compression level may be adjusted by adjusting the number of chunks that the speech features 142 are divided into, and/or adjusting the number of clusters per chunk, e.g., the number of different entries in each codebook.

During stage (D), the client device 110 sends compressed values 144 to the server system 120 over the network 118. The compressed values 144 may include significantly less data than the speech features 142. The compressed values 144 may be provided as individual values, as one or more vectors of values, or in another form.

During stage (E), the server system 120 computes an index value 150 using the compressed values 144. The server system 120 determines the index value 150 in order to look up acoustic model scores from a cache 152. The index value 150 allows the server system 120 to identify, in the cache, scores that an acoustic model 160 would produce, or an approximation of the scores the acoustic model 160 would produce, if the acoustic model 160 were evaluated with the compressed values 144 as input to the acoustic model 160.

The server system 120 may compute the index value 150 by applying a hash function to the compressed values 144, so that the index value 150 is a hash value. The server system 120 may use a locality-sensitive hashing (LSH) algorithm. As a result, sets of compressed values 144 that are similar but not identical may correspond to index values that are nearby in the cache 152.

During stage (F), the server system 120 uses the index value 150 to look up one or more scores in the cache 152. In the example, the cache 152 is organized as a hash table, where the index values correspond to hash values determined from compressed speech data values 144. Obtaining scores from the cache 152 may be done efficiently, since using the cache 152 may involve a single hash table lookup, while obtaining the same scores by evaluating the model 160 may require many floating point calculations. The cache 152 is populated with entries that respectively include one or more posterior probability scores for a set of compressed speech data values, associated with the hash value of the set of compressed speech data values. The cache 152 may not include scores for every possible set of compressed values. Rather, the cache 152 may store pre-computed scores for, for example, only a number of commonly occurring sets of compressed values.

In some implementations, the cache 152 may be distributed across multiple nodes or processing modules that each provide access to a portion of the cache 152. For example, access to different portions of a hash table that includes stored scores may be distributed across multiple server machines. The computing device 120 may access the cache 152 by issuing a remote procedure calls to multiple server computers or nodes to request cached scores. In some instances, distributing the cache 152 across multiple machines may provide faster lookup of scores from the cache 152, and may allow the cache 152 to store of more data than can be reasonably stored or served from a single machine. Similarly, a distributed system may increase the overall throughput and responsiveness for the cache 152 when many requests are made, or when the cache 152 is accessed by many different computing systems.

When the cache 152 includes scores associated with the index value 150, the scores associated with the index 150 may be selected and used. These scores may be the same posterior probability scores that the acoustic model 160 would produce if provided the compressed values 144 as input. When the cache 152 does not include scores associated with the index value 150, scores in a nearby entry may be selected instead. For example, nearest-neighbor algorithms may be used to look up and return the scores for the most similar set of compressed values for which scores are stored. When LSH is used, scores for the most similar set of compressed values may be the scores corresponding to the nearest index value.

As an alternative, if the cache 152 does not include scores associated with the index value 150, the server system 120 may use the acoustic model 160 to determine scores for the compressed values 144. For example, if the nearest index value that has associated scores in the cache 152 has more than a threshold difference from the index value 150, the server system 120 may determine that suitable scores are not stored in the cache 152 and may obtain scores from the acoustic model 160 rather than from the cache 152.

In the illustrated example, there are no scores stored in the cache for index value "1A63," which represents the particular index value 150 generated for the compressed values 144. As a result, the scores for a set of values similar to the compressed values 144 are found and returned instead. For example, the scores associated with an index value that is closest to the index value 150 are selected. As illustrated, this nearby index value is illustrated as "1A64," and a number of acoustic model scores 155 are associated with it. The acoustic model scores 155 are pre-computed outputs of the acoustic model 160 for a set of values that is not exactly the same as the compressed values 144. Nevertheless, the nearness of the hash values "1A63" and "1A64" indicates that the scores 155 are a good approximation for the output of the acoustic model 160 for the compressed values 144.

During stage (G), the server system 120 uses the selected scores 155 to determine a transcription for the utterance. In the example, the selected scores 155 each indicate a likelihood that a speech frame corresponds to a different phonetic unit. For example, the score 155*a* is a likelihood value of "0.6" that the speech frame represents an "/s/" sound, the score 155*b* is a likelihood value of "0.3" that the speech frame represents a "/z/" sound, and the score 155*c* is a likelihood value of "0.1" that the speech frame represents a "/c/" sound. Thus, the selected scores 155*a*-155*c* indicate that the speech frame that corresponds to the compressed values 144 is most likely an "/s/" sound.

While the illustrated example shows scores for phonemes, scores may correspond to other phonetic units. In some implementations, each acoustic model score indicates the posterior probability for a component of a phoneme. For example, each phoneme may be represented by three hidden Markov model (HMM) states. Each acoustic model score in the cache 152 may indicate a score for a particular HMM state of a particular phoneme, rather than simply a phoneme in its entirety.

In some implementations, cached scores and/or acoustic model outputs correspond to context-dependent states, such as context-dependent tied triphone states. Using triphones, the number of total phonetic units may be, theoretically, as many as the number of potential phonemes raised to the third power. In some instances, there may be a few thousand different states to tens of thousands of states. The acoustic model 160 or cache 152 may provide a score for each of the various context-dependent states, although, as discussed below, the cache 152 may approximate some scores with zero values to conserve storage space. The set of phonetic units used may include states associated with any appropriate amount of phonetic context, e.g., with states dependent on longer or shorter sequences of phones, in addition to or instead of using triphone states.

To conserve space and reduce processing requirements, the cache 152 may use a sparse encoding that stores acoustic model scores for only some of the possible phonetic units that may be occur. For example, if a total of 40 phonemes may be predicted, and each phoneme has three HMM states, the result would be 120 different phonetic units or unique HMM states. As another example, using context-dependent tied triphone states, there may be thousands of Scores for phonetic units having low or zero probability scores may be omitted from the cache 152. For example, scores indicating a likelihood of at least 5%, or at least 10%, or another threshold value may be stored by the model, while scores indicating probabilities less than the threshold may be excluded. As another example, a certain number of scores, such as the scores for the 5, 10, or 20 phonetic units with the highest likelihood may be stored while the rest are excluded. When scores are stored for some phonetic units and not others, the omitted scores may be assumed to have a zero probability.

The server system 120 may obtain acoustic model scores from the cache 152 in the same manner discussed above for the other speech frames of the utterance. The server system 120 may then use the acoustic model scores for multiple speech frames to construct a transcription for the utterance. In addition to using the likelihoods of the phonetic units indicated by the acoustic model scores, the server system 120 may identify which sequences of phonetic units correspond to valid words in a lexicon, and use a language model to determine which words and sequences of words are most likely to occur.

During stage (H), the server system 120 provides a transcription of the utterance to the client device 110, which may then store, display, or otherwise use the transcription.

In some implementations, the actions described in FIG. 1 may be repeated for multiple speech frames, for example, for each speech frame in the utterance of the user 102. Data from the client device 110 including sets of compressed values for various speech frames may be provided to the server system 120 in individually or in groups as the client device 110 receives more audio and additional sets of compressed values become available. Similarly, the server system 120 may continue to provide additional transcription information as more transcriptions are determined for additional portions of an utterance.

In some implementations, the functions illustrated as being performed by the client device 110 may be performed by the server system 120, and vice versa. For example, the client device 110 may provide uncompressed speech features 142 to the server system 120, and the server system 120 may determine the compressed values 144. As another example, the client device 110 may provide audio waveform data 140 to the server system 120, and the server system 120 may determine speech features 142 and compressed values 144. As an alternative, a single device may use the techniques disclosed without using client/server interactions. For example, the client device 110 may independently receive audio, determine speech features 142 and compressed values 144, look up scores in a cache, and determine a transcription without the assistance of the a server system and without providing speech data over a network.

Figure 2:
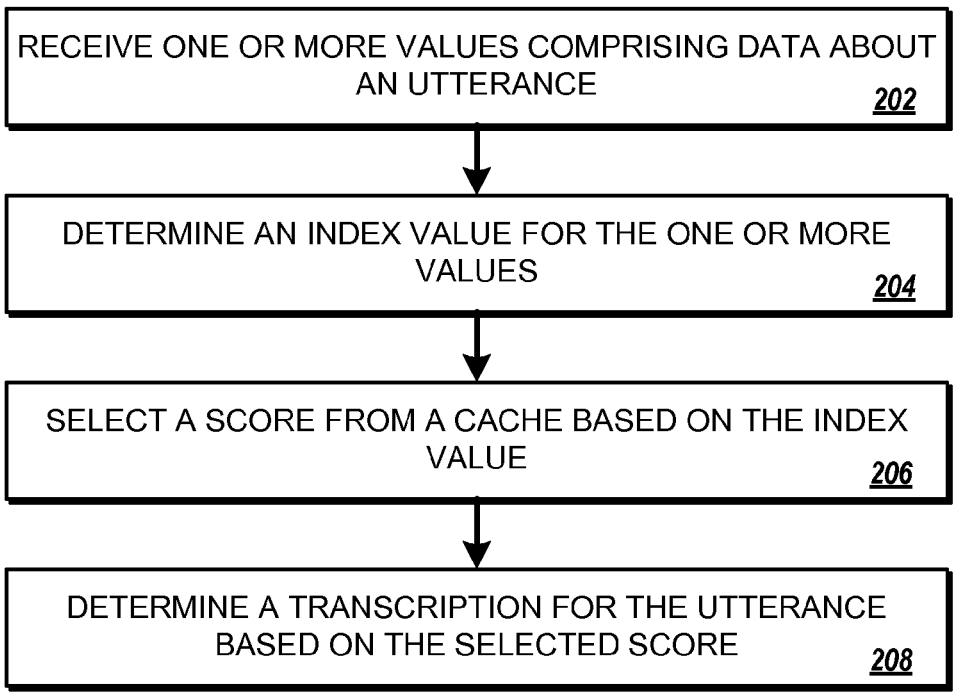
FIG. 2 is a flow diagram that illustrates an example of a process for using cached speech recognition scores.

FIG. 2 is a flow diagram that illustrates an example of a process 200 for using cached speech recognition scores. The process 200 may be performed by a computing system, such as the server system 120 of FIG. 1 or another computing system.

The computing system receives one or more values comprising data about an utterance (202). The one or more values may be data derived from speech features computed for the utterance. For example, the one or more values may include output of vector quantization performed on speech features for the utterance.

The computing system determines an index value for the one or more values (204). For example, the computing system may apply a hash function to the one or more values to determine a hash value that may serve as an index to a cache of speech recognition scores. The computing system may apply a locality-sensitive hash function to determine the index value.

In some implementations, the one or more values comprise information derived from a particular speech frame and information derived from contextual speech frames occurring before or after the particular frame. The index value may be determined based on the information derived from a particular speech frame and information derived from the contextual speech frames occurring before or after the particular frame.

The computing system selects an acoustic model score based on the index value (206). The acoustic model score may be selected from a cache of acoustic model scores that were computed before receiving the one or more values. The acoustic model score may indicate a likelihood that a particular speech frame that corresponds to the one or more values is an instance of a particular phonetic unit. For example, the score can be a posterior probability score that was computed by an acoustic model for a set of input values that is the same as or is similar to the received one or more values.

The computing system may select an acoustic model score that is associated with the index value in the cache. As a result, the score selected from the cache may be an acoustic model score previously generated for a set of values that matches the received one or more values. As another example, if the cache does not include scores associated with the determined index value, the computing system may identify an acoustic model score that is associated with an index value that is near the determined index value but is different from the determined index value. Thus, the score selected from the cache may be an acoustic model score previously generated for a set of values that does not exactly match the received one or more values, and the score approximates an acoustic model score for the received one or more values.

In some implementations, the computing system selects a multiple acoustic model scores from the cache based on the index value. For example, the computing system may identify multiple scores that each correspond to different phonetic units. Each score can indicate a likelihood that the utterance includes a different phonetic unit in a portion corresponding to the one or more values. The phonetic units may be, for example, phonemes or sub-components of phonemes, such as different HMM model states of phonemes.

The computing system determines a transcription for the utterance using the selected acoustic model score (208). For example, the computing system may use one or more acoustic model scores selected from the cache to estimate which phoneme or state of a phoneme corresponds to a particular speech frame. The selected acoustic model score may be used with acoustic model scores selected for other speech frames to determine likely sequences of phonemes or words occur in the utterance.

In some implementations, the one or more values are received from a client device over a network, and the computing device provides the transcription to the client device over the network.

In some implementations, if a cache does not store scores that meet predetermined criteria, the computing system obtains scores from an acoustic model instead of the cache. For example, if the cache does not include scores corresponding to the index value, or does not include scores associated with any index values within a particular range of the index value, the computing system determines scores using the acoustic model. For example, a second set of one or more values corresponding to the utterance may be received, e.g., for a second speech frame of the utterance, and a second index value for the second set of one or more values may be determined. The computing system may determine that the cache does not include an acoustic model score that is appropriate for the second index value, and in response, generate an acoustic model score corresponding to the second set of one or more vectors using an acoustic model. The transcription may be determined using the selected acoustic model score and the generated acoustic model score.

Figure 3:
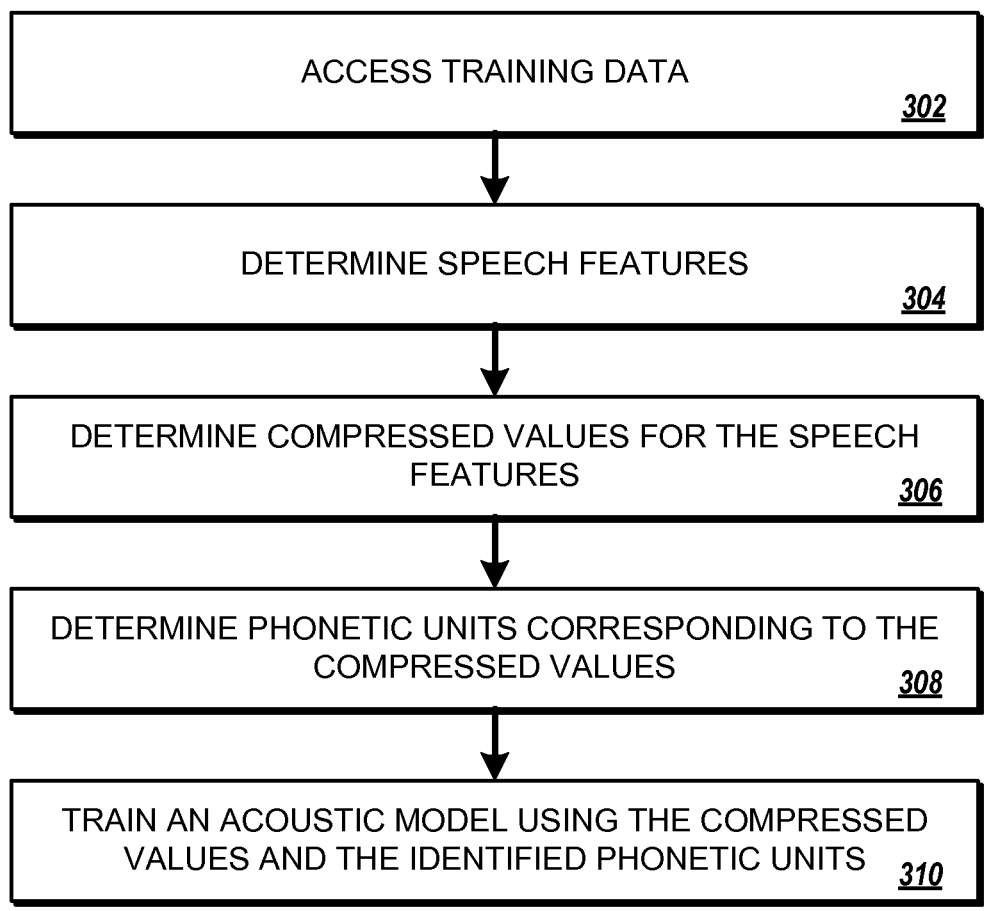
FIG. 3 is a flow diagram that illustrates an example of a process for training a speech recognition model.

FIG. 3 is a flow diagram that illustrates an example of a process 300 for training a speech recognition model. The process 300 may be performed to train an acoustic model to produce posterior probability scores using compressed values derived from speech features, rather than using speech features as input. The process 300 may be performed by a computing system, such as the server system 120 of FIG. 1 or another computing system.

The computing system accesses a set of training data (302). The training data can include recorded audio for a variety of utterances. The training data may also include transcriptions of the utterances.

The computing system determines speech features for the utterances in the training data (304). For example, the computing system may determine MFCCs and/or filterbank energies as discussed above. The speech features may be determined for each speech frame of each audio segment in the training data to be used for training the acoustic model.

The computing system determines compressed values from the speech features (306). For example, vector quantization may be used to map the speech features for each speech frame to a set of vector quantization outputs, for example, a set of integers. As a result, a set of values representing compressed speech features may be determined for each of many or all of the speech frames in the training data.

In some implementations, the speech features determined from the training data may be used to determine one or more vector quantization codebooks, and these codebooks may then be used to determine the compressed values. For example, clustering algorithms may be applied to the sets of speech features determined from the training data. The identified clusters may be used to assign codes in the codebook. Multiple different codebooks can be generated for use with different sets of speech vectors or subsets of feature vectors.

The computing system determines phonetic units corresponding to the compressed values (308). For example, phonetic representations of the transcriptions may be determined, and the phonetic representations may be aligned with the speech frames. The particular phonetic units that correspond to the respective speech frames and their compressed values may be determined.

The computing system trains an acoustic model using the compressed values and the phonetic units corresponding to the compressed values (310). The acoustic model may be any of various types of models. For example, the model may be a generative probabilistic model, such as a multivariate GMM. As another example, the model may be a discriminative classifier, such as a multilayer DNN. The acoustic model may be trained to predict the likelihood of the various potential phonetic units based on the compressed speech features being provided as input. Some training approaches may adjust model parameters to reflect the statistical distributions of the compressed values and the phonetic units of their corresponding speech frames. Some training approaches may involve inputting compressed values to the model, obtaining an output from the model indicating a probability or prediction for a phonetic unit, and comparing the output to the actual phonetic unit corresponding to the compressed values that were input. Training of the model may proceed until, for example, the output of the model provides probability scores that result in a desired level of accuracy or reflect a statistical distribution within a desired tolerance.

Figure 4:
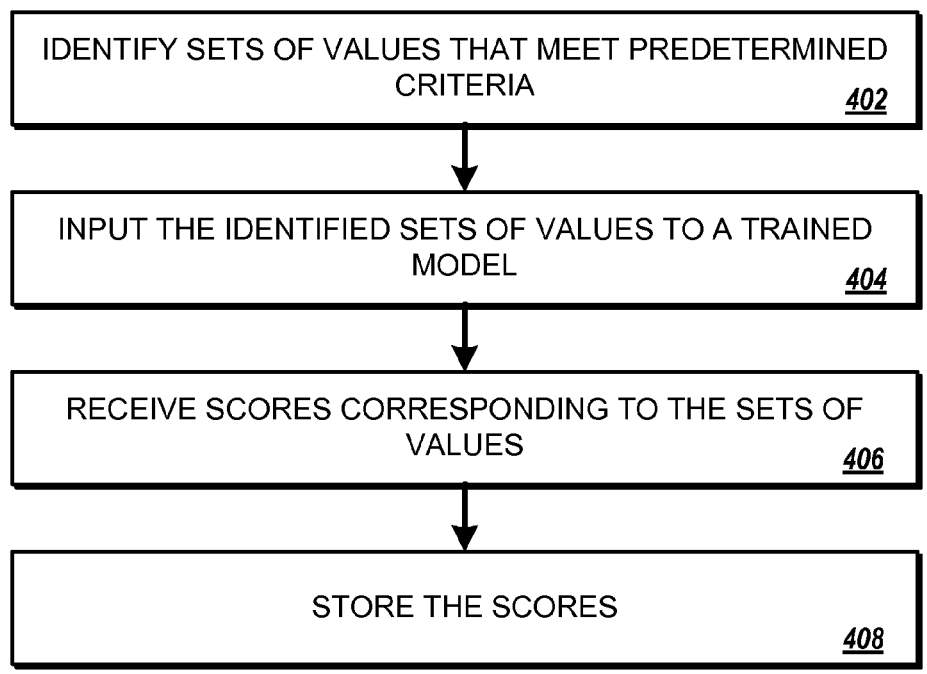
FIG. 4 is a flow diagram that illustrates an example of a process for preparing a cache of speech recognition scores.

FIG. 4 is a flow diagram that illustrates an example of a process 400 for preparing a cache of speech recognition scores. The process 400 may be performed to prepare a cache for use in speech recognition. The process 400 may be performed by a computing system, such as the server system 120 of FIG. 1 or another computing system.

The computing system identifies compressed values that meet a set of criteria (402). For example, the computing system may analyze sets of compressed values derived from audio in a sample data set, which may be the same as or different from the training data used to train the acoustic model. The computing system may select each set of compressed values that occurs at least a minimum number of times. Alternatively, the computing system may select a particular amount of sets of compressed values that occur most frequently in the sample data set.

The computing system inputs each identified set of compressed values to the trained acoustic model (404). Each set of compressed values may be a vector that represents compressed data from a common type of speech frame. For example, each vector may be input, one at a time, to the trained acoustic model.

The computing system receives, from the trained acoustic model, scores corresponding to the sets of compressed values (406). For example, the computing system may receive, for each input vector, a set of posterior probability scores for each of the possible phonetic units that may occur.

The computing system stores the scores from the acoustic model in a cache (408). For example, for each set of compressed values selected during action (402), the computing system computes an index value, for example, using a LSH algorithm. The computing system then stores the probability scores produced by the acoustic model for a particular set of compressed values, in association with the index value for the particular set of compressed values. As a result, the cache stores scores generated for different sets of compressed values, each in association with hash value index values, as illustrated for the cache 152 in FIG. 1.

Each index in the hash, and thus each set of compressed values, may have multiple associated probability scores. For example, the acoustic model may provide a score for each of the different phonetic units that may occur in speech. The computing system may prune the scores provided by the acoustic model and store only a proper subset of the acoustic model scores in the cache for a given index value. For example, the computing system may store scores for only the most likely phonetic units for each set of compressed values, or may store only scores indicating a likelihood that satisfies a minimum threshold.

Figure 5:
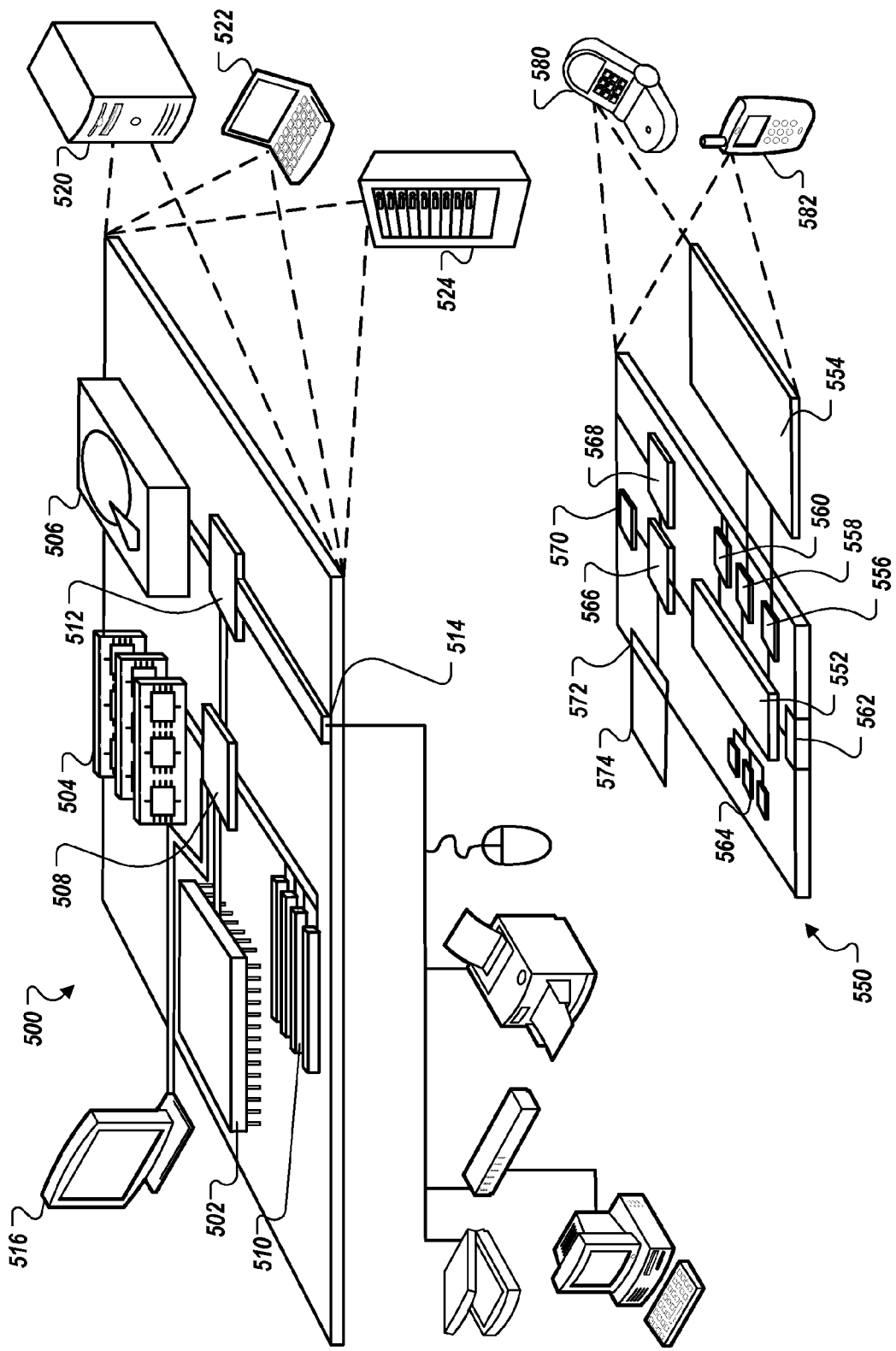
FIG. 5 is a schematic diagram that shows an example of a computing device and a mobile computing device.

FIG. 5 shows an example of a computing device 500 and an example of a mobile computing device that can be used to implement the techniques described above. The computing device 500 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is exemplary only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 564, the expansion memory 574, or memory on the processor 552. In some implementations, the computer program product can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, tablet computer, wearable computer, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

In addition, while various examples describe the use of vector quantization and caching scores for speech recognition, the same techniques may be used in additional applications. For example, the same approach may be used to efficiently store and retrieve scores, such as posterior probability scores or other scores, for any feature-based task. Features that are extracted for language identification, speaker identification, object identification in photographs or videos, document indexing, or other tasks may each be compressed, e.g., using vector quantization. A hash value or other index value may then be determined from the compressed feature data in order to look up previously-computed scores that are stored in a cache.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semi-conductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A method performed by one or more computers of an automated speech recognition system, the method comprising:
receiving, by the one or more computers of the automated speech recognition system, one or more values comprising data that indicates acoustic characteristics of an utterance;
determining, by the one or more computers of the automated speech recognition system, an index value for the one or more values;
accessing, by the one or more computers of the automated speech recognition system, a cache of acoustic model scores that were computed before receiving the one or more values, wherein the cache indicates a mapping of the acoustic model scores to index values, the mapping being determined before receiving the one or more values;
selecting, by the one or more computers of the automated speech recognition system, a subset of the acoustic model scores in the cache based on the determined index value;
determining, by the one or more computers of the automated speech recognition system, a transcription for the utterance using the selected subset of the acoustic model scores; and
providing, by the one or more computers of the automated speech recognition system, an output of the automated speech recognition system, wherein the output of the automated speech recognition system includes data indicating the transcription determined using the selected subset of the acoustic model scores.

2. The method of claim 1, wherein determining the index value comprises generating a hash value for the one or more values using a locality sensitive hash function.

3. The method of claim 2, wherein selecting the subset of the acoustic model scores in the cache comprises selecting an acoustic model score previously generated for a set of values that matches the received one or more values.

4. The method of claim 2, wherein selecting the subset of the acoustic model scores in the cache comprises selecting an acoustic model score previously generated for a set of values that does not exactly match the received one or more values, the acoustic model score approximating an acoustic model score for the received one or more values.

5. The method of claim 1, wherein the one or more values comprise information derived from a particular speech frame and information derived from contextual speech frames occurring before or after the particular frame; and
wherein determining the index value for the one or more values comprises determining, as the index value, a hash value for the particular speech frame based on the information derived from a particular speech frame and information derived from the contextual speech frames occurring before or after the particular frame.

6. The method of claim 5, wherein selecting the subset of the acoustic model scores in the cache comprises selecting an acoustic model score indicating a likelihood that the particular speech frame is an occurrence of a particular phonetic unit in the utterance.

7. The method of claim 1, further comprising selecting multiple acoustic model scores from the cache based on the index value, each of the multiple acoustic model scores indicating a likelihood that the utterance includes a different phonetic unit in a portion corresponding to the one or more values.

8. The method of claim 1, wherein receiving the one or more values comprises, receiving the one or more values from a client device over a network; and
wherein the method further comprises providing the transcription to the client device over the network.

9. The method of claim 1, wherein the one or more values comprise results of compressing speech features for the utterance using vector quantization.

10. An automated speech recognition system comprising:
one or more computers; and
one or more storage devices storing instructions that are operable, when executed by the one or more computers, to cause the one or more computers to perform operations comprising:
receiving one or more values comprising data that indicates acoustic characteristics of an utterance;
determining an index value for the one or more values;
accessing a cache of acoustic model scores that were computed before receiving the one or more values, wherein the cache indicates a mapping of the acoustic model scores to index values, the mapping being determined before receiving the one or more values;
selecting a subset of the acoustic model scores in the cache based on the determined index value;
determining a transcription for the utterance using the selected subset of the acoustic model scores; and
providing an output of the automated speech recognition system, wherein the output of the automated speech recognition system includes data indicating the transcription determined using the selected subset of the acoustic model scores.

11. The system of claim 10, wherein determining the index value comprises generating an index of a hash table.

12. The system of claim 11, wherein selecting the subset of the acoustic model scores in the cache comprises selecting an acoustic model score previously generated for a set of values that does not exactly match the received one or more values, the acoustic model score approximating an acoustic model score for the received one or more values.

13. The system of claim 10, wherein the one or more values comprise information derived from a particular speech frame and information derived from contextual speech frames occurring before or after the particular frame; and wherein determining the index value for the one or more values comprises determining, as the index value, a hash value for the particular speech frame based on the information derived from a particular speech frame and information derived from the contextual speech frames occurring before or after the particular frame.

14. A computer storage device storing instructions that, when executed by one or more computers of an automated speech recognition system, cause the one or more computers to perform operations comprising:

receiving one or more values comprising data that indicates acoustic characteristics of an utterance;

determining an index value for the one or more values;

accessing a cache of acoustic model scores that were computed before receiving the one or more values, wherein the cache indicates a mapping of the acoustic model scores to index values, the mapping being determined before receiving the one or more values;

selecting a subset of the acoustic model scores in the cache based on the determined index value;

determining a transcription for the utterance using the selected subset of the acoustic model scores; and providing an output of the automated speech recognition system, wherein the output of the automated speech recognition system includes data indicating the transcription determined using the selected subset of the acoustic model scores.

15. The computer storage device of claim 14, wherein the index value corresponds to a storage location in the cache;

wherein selecting the subset of the acoustic model scores in the cache based on the determined index value comprises:

using the mapping to determine the storage location corresponding to the index value;

retrieving, from the storage location corresponding to the index value, a set of multiple acoustic model scores, each of the multiple acoustic model scores indicating a likelihood of occurrence for a different phonetic unit; and selecting the set of acoustic model scores retrieved from the storage location corresponding to the index value as the subset.

16. The computer storage device of claim 14, wherein the one or more values comprise information derived from a particular speech frame and information derived from contextual speech frames occurring before or after the particular frame;

wherein determining the index value for the one or more values comprises determining a hash value for the particular speech frame based on the information derived from a particular speech frame and information derived from the contextual speech frames occurring before or after the particular frame;

wherein selecting the subset of the acoustic model scores comprises retrieving one or more acoustic model scores from the cache using the hash value; and wherein determining a transcription for the utterance using the selected subset of the acoustic model scores comprises determining a phonetic unit corresponding to the particular speech frame based on the retrieved one or more acoustic model scores.

17. The method of claim 1, wherein selecting a subset of the acoustic model scores in the cache based on the determined index value comprises determining one or more scores that the mapping indicates correspond to the determined index value.

18. The method of claim 1, wherein receiving the one or more values comprising data about an utterance comprises receiving the one or more values, by the one or more computers of the automated speech recognition system, from a client device over a network; and wherein providing the data indicating the transcription as an output of the automated speech recognition system comprises providing the data indicating the transcription, by the one or more computers of the automated speech recognition system, to the client device over the network.

19. The method of claim 1, wherein receiving the one or more values comprising data about an utterance comprises receiving, by the one or more computers of the automated speech recognition system, data including a particular portion of the utterance;

wherein selecting a subset of the acoustic model scores in the cache comprises selecting, by the one or more computers of the automated speech recognition system, a particular acoustic model score indicating a likelihood corresponding to a particular phonetic unit; and wherein determining the transcription for the utterance comprises determining the transcription using the particular acoustic model score to represent a likelihood that the particular portion of the utterance is an occurrence of the particular phonetic unit.

20. The method of claim 1, wherein the cache maps an index value to a set of multiple acoustic model scores, where each of the acoustic model scores indicates a likelihood for a different phonetic unit.

* * * * *